(12) United States Patent
Sullivan et al.

(10) Patent No.: US 10,166,441 B2
(45) Date of Patent: *Jan. 1, 2019

(54) THREE-COVER-LAYER GOLF BALL HAVING TRANSPARENT OR PLASTICIZED POLYAMIDE INTERMEDIATE LAYER

(71) Applicant: Acushnet Company, Fairhaven, MA (US)

(72) Inventors: Michael J. Sullivan, Old Lyme, CT (US); David A. Bulpett, Boston, MA (US); Robert Blink, Newport, RI (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,742

(22) Filed: Jun. 2, 2017

(65) Prior Publication Data

US 2017/0266507 A1    Sep. 21, 2017

Related U.S. Application Data

(60) Division of application No. 14/487,225, filed on Sep. 16, 2014, now Pat. No. 9,669,265, which is a continuation-in-part of application No. 13/723,433, filed on Dec. 21, 2012, now Pat. No. 8,834,301, which is a continuation of application No. 13/487,480, filed on Jun. 4, 2012, now Pat. No. 8,337,333, which is a division of application No.

(Continued)

(51) Int. Cl.
| A63B 37/06 | (2006.01) |
| A63B 37/00 | (2006.01) |
| C08L 77/00 | (2006.01) |

(52) U.S. Cl.
CPC ...... *A63B 37/0076* (2013.01); *A63B 37/0031* (2013.01); *A63B 37/0033* (2013.01); *A63B 37/0039* (2013.01); *A63B 37/0043* (2013.01); *A63B 37/0045* (2013.01); *A63B 37/0062* (2013.01); *A63B 37/0075* (2013.01); *A63B 37/0092* (2013.01); *C08L 77/00* (2013.01); *A63B 37/0027* (2013.01)

(58) Field of Classification Search
CPC .................................. A63B 37/0039
USPC .................................. 473/373, 374
See application file for complete search history.

(56) References Cited

U.S. PATENT DOCUMENTS

| 4,115,475 A | 9/1978 | Foy et al. |
| 4,195,015 A | 3/1980 | Deleens et al. |

(Continued)

*Primary Examiner* — Raeann Gorden
(74) *Attorney, Agent, or Firm* — William B. Lacy

(57) ABSTRACT

A golf ball includes a core and a three-layer cover disposed adjacent the core. The three-layer cover includes an inner cover, an intermediate cover, and an outer cover. The inner cover includes a non-ionomeric E/Y copolymer where E is an olefin and Y is a carboxylic acid. The inner cover has a hardness of about 45 to 68 Shore D. The outer cover includes a castable thermoset polyurethane and has a hardness of about 40 to 62 Shore D. The intermediate cover layer, disposed between the inner and outer cover layers, is formed from a polyamide composition, where the polyamide composition includes a transparent polyamide having a light transmission of about 50% or greater.

10 Claims, 1 Drawing Sheet

Related U.S. Application Data

12/403,713, filed on Mar. 13, 2009, now Pat. No. 8,202,176.

(56) References Cited

U.S. PATENT DOCUMENTS

| | | |
|---|---|---|
| 4,230,838 A | 10/1980 | Foy et al. |
| 4,331,786 A | 5/1982 | Foy et al. |
| 4,332,920 A | 6/1982 | Foy et al. |
| 4,839,441 A | 6/1989 | Cuzin et al. |
| 4,864,014 A | 9/1989 | Cuzin |
| 5,006,297 A | 4/1991 | Brown et al. |
| 5,334,673 A | 8/1994 | Wu |
| 5,397,840 A | 3/1995 | Sullivan et al. |
| 5,484,870 A | 1/1996 | Wu |
| 5,516,847 A | 5/1996 | Sullivan et al. |
| 5,530,083 A | 6/1996 | Phelps et al. |
| 5,733,428 A | 3/1998 | Calabria et al. |
| 5,863,627 A | 1/1999 | Szycher et al. |
| 5,981,654 A | 11/1999 | Rajagopalan |
| 6,056,650 A | 5/2000 | Yamagishi et al. |
| 6,117,025 A | 9/2000 | Sullivan |
| 6,124,389 A | 9/2000 | Cavallaro et al. |
| 6,129,640 A | 10/2000 | Higuchi et al. |
| 6,135,898 A | 10/2000 | Higuchi et al. |
| 6,152,834 A | 11/2000 | Sullivan |
| 6,162,135 A | 12/2000 | Bulpett et al. |
| 6,180,040 B1 | 1/2001 | Ladd et al. |
| 6,231,460 B1 | 5/2001 | Higuchi et al. |
| 6,291,592 B1 | 9/2001 | Bulpett et al. |
| 6,376,037 B1 | 4/2002 | Montanari et al. |
| 6,394,914 B1 | 5/2002 | Sullivan |
| 6,458,895 B1 | 10/2002 | Wrigley et al. |
| 6,465,578 B1 | 10/2002 | Bissonnette et al. |
| 6,506,851 B2 | 1/2003 | Wu |
| 6,528,560 B2 | 3/2003 | Buhler |
| 6,538,099 B2 | 3/2003 | Isobe et al. |
| 6,561,928 B2 | 5/2003 | Binette et al. |
| 6,685,579 B2 | 2/2004 | Sullivan |
| 6,685,580 B2 | 2/2004 | Sullivan |
| 6,705,956 B1 | 3/2004 | Moriyama et al. |
| 6,736,737 B2 | 5/2004 | Higuchi et al. |
| 6,739,987 B2 | 5/2004 | Harris et al. |
| 6,743,122 B2 | 6/2004 | Hayashi et al. |
| 6,800,690 B2 | 10/2004 | Rajagopalan et al. |
| 6,831,136 B2 | 12/2004 | Chao et al. |
| 6,835,794 B2 | 12/2004 | Wu et al. |
| 6,855,074 B2 | 2/2005 | Kato |
| 6,855,793 B2 | 2/2005 | Harris et al. |
| 6,872,774 B2 | 3/2005 | Sullivan et al. |
| 6,910,974 B2 | 6/2005 | Watanabe |
| 6,943,231 B2 | 9/2005 | Buhler |
| 6,966,849 B2 | 11/2005 | Kato |
| 7,005,479 B2 | 2/2006 | Morgan et al. |
| 7,037,217 B2 | 5/2006 | Harris et al. |
| 7,045,185 B2 | 5/2006 | Jacques et al. |
| 7,105,610 B2 | 9/2006 | Wu et al. |
| 7,131,915 B2 | 11/2006 | Sullivan et al. |
| 7,297,737 B2 | 11/2007 | Fish, Jr. et al. |
| 7,331,878 B2 | 2/2008 | Boehm et al. |
| 7,345,116 B2 | 3/2008 | Shaikh et al. |
| 7,358,305 B2 | 4/2008 | Rajagopalan |
| 7,427,243 B2 | 9/2008 | Sullivan |
| 7,491,787 B2 | 2/2009 | Wu et al. |
| 8,202,176 B2 | 6/2012 | Sullivan et al. |
| 8,309,643 B2 | 11/2012 | Thullen et al. |
| 8,337,333 B2 | 12/2012 | Sullivan et al. |
| 8,399,557 B2 | 3/2013 | Montanari et al. |
| 8,507,598 B2 | 8/2013 | Buhler et al. |
| 9,669,265 B2 * | 6/2017 | Sullivan ............ A63B 37/0031 |
| 2003/0125480 A1 * | 7/2003 | Sullivan ............ A63B 37/0003 |
| | | 525/418 |
| 2004/0235587 A1 | 11/2004 | Sullivan et al. |
| 2010/0140846 A1 * | 6/2010 | Montanari ............ C08L 77/00 |
| | | 264/331.19 |
| 2010/0183837 A1 | 7/2010 | Hochstetter et al. |
| 2010/0203275 A1 | 8/2010 | Hoffmann et al. |
| 2012/0223453 A1 | 9/2012 | Grimes et al. |
| 2013/0202831 A1 | 8/2013 | Chlun et al. |
| 2015/0005107 A1 | 1/2015 | Sullivan |

* cited by examiner

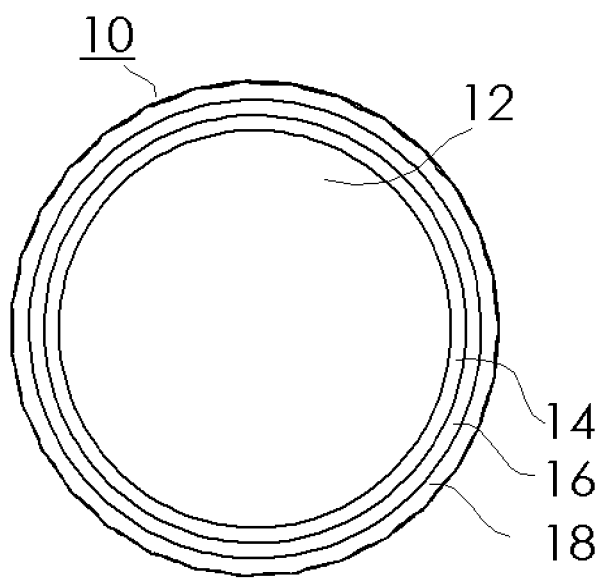

THREE-COVER-LAYER GOLF BALL HAVING TRANSPARENT OR PLASTICIZED POLYAMIDE INTERMEDIATE LAYER

CROSS-REFERENCE TO RELATED APPLICATIONS

This application is a divisional of co-pending U.S. patent application Ser. No. 14/487,225, filed Sep. 16, 2014, which is a continuation-in-part of U.S. patent application Ser. No. 13/723,433, filed Dec. 21, 2012 and now U.S. Pat. No. 8,834,301, which is a continuation of U.S. patent application Ser. No. 13/487,480, filed Jun. 4, 2012 and now U.S. Pat. No. 8,337,333, which is a divisional of U.S. patent application Ser. No. 12/403,713, filed Mar. 13, 2009 and now U.S. Pat. No. 8,202,176, the disclosures of which are incorporated herein by reference thereto.

FIELD OF THE INVENTION

This invention relates generally to golf balls, and more specifically, to a golf ball having a cover including at least three layers, the intermediate cover layer being formed from a stiff, thermoplastic polyurethane or polyurea material.

BACKGROUND OF THE INVENTION

The majority of golf balls commercially available today are of a solid construction. Solid golf balls include one-piece, two-piece, and multi-layer golf balls. One-piece golf balls are inexpensive and easy to construct, but have limited playing characteristics and their use is, at best, confined to the driving range. Two-piece golf balls are generally constructed with a solid polybutadiene core and a cover and are typically the most popular with recreational golfers because they are very durable and provide good distance. These golf balls are also relatively inexpensive and easy to manufacture, but are regarded by top players as having limited playing characteristics. Multi-layer golf balls are comprised of a solid core and a cover, either of which may be formed of one or more layers. These balls are regarded as having an extended range of playing characteristics, but are more expensive and difficult to manufacture than are one- and two-piece golf balls.

Wound golf balls, which typically included a fluid-filled center surrounded by a layer of tensioned elastomeric material and a cover, were preferred for their spin and "feel" characteristics but were more difficult and expensive to manufacture than solid golf balls. Manufacturers are continuously striving to produce a solid ball that concurrently includes the beneficial characteristics of a wound ball.

Golf ball playing characteristics, such as compression, velocity, and spin can be adjusted and optimized by manufacturers to suit players having a wide variety of playing abilities. For example, manufacturers can alter any or all of these properties by changing the materials and/or the physical construction of each or all of the various golf ball components (i.e., centers, cores, intermediate layers, and covers). Finding the right combination of core and layer materials and the ideal ball construction to produce a golf ball suited for a predetermined set of performance criteria is a challenging task.

Efforts to construct a multi-layer golf ball have generally focused on the use of one or two cover layers formed of ionomeric and/or polyurethane compositions. It is desirable, therefore, to construct a golf ball formed of a urethane or urea outer cover layer, at least two interior cover layers, and a core, according to the present invention. In particular, it is desired that this construction include a thermoplastic non-ionomeric inner cover layer in conjunction with a stiff, thermoplastic polyurethane or polyurea intermediate cover layer, and a thermosetting castable outer cover layer.

SUMMARY OF THE INVENTION

The present invention is directed to a golf ball having a core and a cover disposed about the core. The cover includes a thermoplastic inner cover layer having a hardness between 55 Shore D and 60 Shore D; an outer cover layer having a hardness between 55 Shore D and 60 Shore D; and a stiff intermediate cover layer disposed between the inner and outer cover layers and having a hardness greater than the inner cover layer and the outer cover layer. The inner cover layer is formed from a non-ionomeric composition including a non-ionomeric stiffening polymer and at least one E/Y copolymer or E/X/Y terpolymer, where E is an olefin, Y is a carboxylic acid, and X is a softening comonomer. The intermediate cover layer is formed from a stiff thermoplastic polyurethane or polyurea composition and the cover outer cover layer is formed from a thermoset polyurethane, a polyurea, or a urethane-urea blend.

In one embodiment, the intermediate layer hardness is greater than the inner cover layer hardness and greater than the outer cover layer hardness by at least 5 Shore D, preferably by at least 10 Shore D. The intermediate layer hardness is 60 Shore D or greater, preferably 65 Shore D or greater, more preferably from 70 Shore D to 90 Shore D.

The thermoset polyurethane, polyurea, or urethane-urea blend is preferably a castable thermoset or reaction injection moldable thermoset. In another embodiment, the outer cover is formed from a castable thermoset polyurea and the intermediate cover layer is formed from a stiff thermoplastic polycarbonate-polyurethane. In one construction, the core is a dual core and includes a center and at least one outer core layer. Ideally, the core and/or center are formed from a single homogeneous composition.

The non-ionomeric inner cover layer may further include a polyester/polycarbonate blend, a polyester resin, an acetal resin, a polyamide resin, a polyetheramide resin, a polyester resin, a polyester elastomer, a liquid crystalline polyester, a polyester/polyamide blend, a poly(arylene ether)/polyester resin, or a polyimide. Preferably, the olefin is ethylene; the carboxylic acid is acrylic acid, methacrylic acid, crotonic acid, maleic acid, fumaric acid, itaconic acid, or a combination thereof; and the softening comonomer is vinyl esters of aliphatic carboxylic acids of 2 to about 10 carbon atoms, alkyl ethers of 1 to about 10 carbon atoms, alkyl acrylates or alkyl alkylacrylates of 1 to about 10 carbon atoms, or blends thereof.

The non-ionomeric composition is preferably an E/Y copolymer comprising an ethylene/acrylic acid copolymer or an ethylene/methacrylic acid copolymer. In an alternative embodiment, the non-ionomeric composition is an E/X/Y terpolymer comprising an ethylene/methyl acrylate/acrylic acid terpolymer, an ethylene/n-butyl acrylate/methacrylic acid terpolymer, or an ethylene/isobutyl-acrylate/methacrylic acid terpolymer.

The stiffening polymer includes polyamides, single-site catalyzed polymers, metallocene-catalyzed polymers, polyesters, poly(ethylene terephthalate), poly(butylene terephthalate), poly(propylene terephthalate), poly(trimethylene terephthalate), poly(ethylene naphthenate), polystyrene polymers, poly(styrene-co-maleic anhydride), acrylonitrile-butadiene-styrene, poly(styrene sulfonate), polyethylene styrene, grafted polypropylenes, grafted polyethylenes, polyvinyl chlorides, grafted polyvinyl chlorides; polyvinyl acetates having less than about 9% of vinyl acetate by weight, polycarbonates, blends of polycarbonate and acrylonitrile-butadiene-styrene, blends of polycarbonate and polyurethane, polyvinyl alcohols, polyvinyl alcohol copolymers, polyethers, polyarylene ethers, polyphenylene oxides; block copolymers of alkenyl aromatics with vinyl aromatics and polyamic esters, polyimides, polyetherketones, or polyamideimides.

A combination of the inner cover, the intermediate cover, and the outer cover have a total thickness of 0.125 inches or less, preferably 0.115 inches or less. The outer cover layer hardness is typically less than the inner cover layer hardness.

The present invention is also directed to a golf ball comprising a core and a cover. The cover includes an non-ionomeric inner cover layer formed from a non-ionomeric composition including a non-ionomeric stiffening polymer and an E/X/Y terpolymer, where E is an olefin, Y is a carboxylic acid, and X is a softening comonomer, the inner cover having a hardness of 55 Shore D to 60 Shore D; a castable thermoset outer cover layer having a hardness between 55 Shore D and 60 Shore D; and an intermediate cover layer formed from a stiff thermoplastic polyurethane or polyurea composition disposed between the inner and outer cover layers and having a hardness greater than the inner cover layer and the outer cover layer. The inner cover layer has a first thickness, the outer cover layer has a second thickness, and the intermediate cover layer has a third thickness less than the first or second thickness by at least 20%.

The present invention is further directed to a golf ball having a core and a cover. The cover includes a non-ionomeric inner cover layer formed from an E/Y copolymer where E is an olefin and Y is a carboxylic acid, the inner cover having a hardness of 55 Shore D to 60 Shore D; a castable thermoset polyurethane outer cover layer having a hardness between 55 Shore D and 60 Shore D; and a stiff thermoplastic polyurethane or polyurea intermediate cover layer disposed between the inner and outer cover layers, the non-ionomeric intermediate cover layer having a hardness greater than the inner cover layer and the outer cover layer. The inner cover layer has a first thickness, the outer cover layer has a second thickness, and the intermediate cover layer has a third thickness less than the first or second thickness by at least 20%.

The present invention is also directed to a golf ball including a core and a three-layer cover disposed adjacent the core. The three-layer cover includes an inner cover, an intermediate cover, and an outer cover. The inner cover includes a non-ionomeric E/Y copolymer where E is an olefin and Y is a carboxylic acid. The inner cover has a hardness of about 45 to 68 Shore D. The outer cover includes a castable thermoset polyurethane and has a hardness of about 40 to 62 Shore D. The intermediate cover layer, disposed between the inner and outer cover layers, is formed from a polyamide composition, where the polyamide composition includes a transparent polyamide having a light transmission of about 50% or greater.

The transparent polyamide may be a transparent polyether-amide block copolymer. Alternatively, the transparent polyamide has an amorphous, quasi-amorphous, semicrystalline, or microcrystalline structure. Preferably, the transparent polyamide has a glass transition temperature in the range of about 75° C. to about 160° C., more preferably about 80° C. to about 95° C. The transparent polyamide may also have a Charpy notched impact-resistance of about 15 kJ/m$^2$ or greater when measured at 23° C., more preferably about 50 kJ/m$^2$ or greater when measured at 23° C. The transparent polyamide preferably has a ratio of Charpy notched impact-resistance measured at 23° C. and measured at −30° C. of at least about 2.0.

In a preferred embodiment, the transparent polyamide has a light transmission of about 80% or greater as measured by ISO 13468 using a 2-mm thick sample at a wavelength of 560 nm. More preferably the light transmission is about 90% or greater. In one embodiment, the transparent polyamide further comprises about 1% by weight to about 60% by weight of an acid anhydride-modified polyolefin.

The intermediate layer hardness is preferably greater than the inner cover layer hardness. In a preferred embodiment, the intermediate layer hardness is greater than the inner cover layer hardness by at least 5 Shore D. Alternatively, the intermediate layer hardness is greater than the outer cover layer hardness and, optionally, the intermediate layer hardness is greater than the outer cover layer hardness by at least 5 Shore D. In one embodiment, the core includes a center and at least one outer core layer.

The non-ionomeric inner cover layer may further include a polyester/polycarbonate blend, a polyester resin, an acetal resin, a polyamide resin, a polyetheramide resin, a polyester resin, a polyester elastomer, a liquid crystalline polyester, a polyester/polyamide blend, a poly(arylene ether)/polyester resin, or a polyimide. The olefin is preferably ethylene and the carboxylic acid is acrylic acid, methacrylic acid, crotonic acid, maleic acid, fumaric acid, itaconic acid, or a combination thereof.

The present invention is additionally directed to a golf ball including a core and a three-layer cover disposed adjacent the core. The three-layer cover includes a non-ionomeric inner cover layer including an E/Y copolymer where E is an olefin and Y is a carboxylic acid, the inner cover being disposed about the core and having a hardness of 45 Shore D to 68 Shore D; a castable thermoset polyurethane outer cover layer having a hardness from about 40 Shore D to 62 Shore D; and an intermediate cover layer disposed between the inner and outer cover layers, the intermediate layer including a polyamide composition and having a hardness greater than a hardness of the inner cover layer. The polyamide composition includes a transparent polyamide having a light transmission of about 80% or greater and a glass transition temperature in the range of about 75° C. to about 160° C.

The present invention is further directed to a golf ball including a core and a two-layer cover disposed adjacent the core. The two-layer cover includes an inner cover layer disposed about the core, the intermediate layer including a polyamide composition; and a castable thermoset polyurethane outer cover layer having a hardness from about 40 to 62 Shore D. The polyamide composition includes a transparent polyamide having a light transmission of about 50% or greater and a glass transition temperature in the range of about 75° C. to about 160° C.

BRIEF DESCRIPTION OF THE DRAWINGS

These and other aspects of the present invention may be more fully understood with reference to, but not limited by, the following drawings.

FIG. 1 is a representative cross section of a golf ball of the invention.

DETAILED DESCRIPTION OF THE INVENTION

A golf ball of the present invention includes a core and a cover comprising an outer cover and at least two inner cover layers, such as an inner cover layer and an intermediate cover layer disposed between the outer cover layer and the inner cover layer. The golf ball cores of the present invention may be formed with a variety of constructions. For example, the core may include a plurality of layers, such as a center and an outer core layer. The core, while preferably solid, may comprise a liquid, foam, gel, or hollow center. The golf ball may also include a layer of tensioned elastomeric material, for example, located between the core and triple cover. In a preferred embodiment, the core is a solid core.

Referring to FIG. 1, in one embodiment of the present invention the golf ball 10 includes a core 12, an inner cover layer 14, an intermediate cover layer 16, and an outer cover layer 18.

Materials for solid cores include compositions having a base rubber, a filler, an initiator agent, and a crosslinking agent. The base rubber typically includes natural or synthetic rubber, such as polybutadiene rubber. A preferred base rubber is 1,4-polybutadiene having a cis-structure of at least 40%. Most preferably, however, the solid core is formed of a resilient rubber-based component comprising a high-Mooney-viscosity rubber and a crosslinking agent.

Another suitable rubber from which to form cores of the present invention is trans-polybutadiene. This polybutadiene isomer is formed by converting the cis-isomer of the polybutadiene to the trans-isomer during a molding cycle. Various combinations of polymers, cis-to-trans catalysts, fillers, crosslinkers, and a source of free radicals, may be used. A variety of methods and materials for performing the cis-to-trans conversion have been disclosed in U.S. Pat. Nos. 6,162,135; 6,465,578; 6,291,592; and 6,458,895, which are incorporated herein, in their entirety, by reference.

Additionally, without wishing to be bound by any particular theory, it is believed that a low amount of 1,2-polybutadiene isomer ("vinyl-polybutadiene") is preferable in the initial polybutadiene to be converted to the trans-isomer. Typically, the vinyl polybutadiene isomer content is less than about 7 percent, more preferably less than about 4 percent, and most preferably, less than about 2 percent.

Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents, zinc carbonate, regrind (recycled core material typically ground to about 30 mesh or less particle size), high-Mooney-viscosity rubber regrind, and the like. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or any or all core and cover layers, if present.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis (t-butylperoxy) diisopropylbenzene, 2,5-dimethyl-2,5 di(t-butylperoxy) hexane or di-t-butyl peroxide and mixtures thereof.

Crosslinkers are included to increase the hardness and resilience of the reaction product. The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. Preferred acrylates include zinc acrylate, zinc diacrylate, zinc methacrylate, and zinc dimethacrylate, and mixtures thereof.

The crosslinking agent must be present in an amount sufficient to crosslink a portion of the chains of polymers in the resilient polymer component. This may be achieved, for example, by altering the type and amount of crosslinking agent, a method well-known to those of ordinary skill in the art.

When the core is formed of a single solid layer comprising a high-Mooney-viscosity rubber, the crosslinking agent is present in an amount from about 15 to about 40 parts per hundred, more preferably from about 30 to about 38 parts per hundred, and most preferably about 37 parts per hundred.

In another embodiment of the present invention, the core comprises a solid center and at least one outer core layer. When the optional outer core layer is present, the center preferably comprises a high-Mooney-viscosity rubber and a crosslinking agent present in an amount from about 10 to about 30 parts per hundred of the rubber, preferably from about 19 to about 25 parts per hundred of the rubber, and most preferably from about 20 to 24 parts crosslinking agent per hundred of rubber. Suitable commercially-available polybutadiene rubbers include, but are not limited to, CB23, CB22, Taktene® 220, and Taktene® 221, from Lanxess Corp.; Neodene® 40 and Neodene® 45 from Karbochem Ltd.; LG1208 from LG Corp. of Korea; and Cissamer® 1220 from Basstech Corp. of India. Other rubbers, such as butyl rubber, chloro or bromyl butyl rubber, styrene butadiene rubber, or trans polyisoprene may be added to the polybutadiene for property or processing modification.

Additionally, the unvulcanized rubber, such as polybutadiene, typically has a Mooney viscosity of between about 40 and about 80, more preferably, between about 40 and about 60, and most preferably, between about 40 and about 55. Mooney viscosity is typically measured according to ASTM D-1646.

The polymers, free-radical initiators, filler, crosslinking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added sequentially.

The cover of the golf ball is a multi-layer cover, preferably comprised of at least three layers, such as an inner cover layer, an intermediate cover layer, and an outer cover layer. While the various cover layers of the present invention may be of any individual thickness, it is preferred that the combination of cover layer thicknesses be no greater than about 0.125 inches, more preferably, no greater than about 0.105 inches, and most preferably, no greater than about 0.09 inches.

Any one of the at least three cover layers preferably has a thickness of less than about 0.05 inches, and more preferably, between about 0.010 inches and about 0.045 inches. Most preferably, the thickness of any one of the layers is between about 0.02 inches and about 0.04 inches.

The inner cover layer of the present invention is preferably formed from a non-ionomeric composition comprising a non-ionomeric stiffening polymer and at least one E/Y copolymer or E/X/Y terpolymer, where E is an olefin, Y is a carboxylic acid, and X is a softening comonomer. The stiffening polymer provides the non-ionemic composition with a flexural modulus and material hardness substantially greater than the copolymer or terpolymer.

Preferably, the olefin is ethylene; the carboxylic acid is acrylic acid, methacrylic acid, crotonic acid, maleic acid, fumaric acid, itaconic acid, or a combination thereof; and the softening comonomer is vinyl esters of aliphatic carboxylic acids of 2 to about 10 carbon atoms, alkyl ethers of 1 to about 10 carbon atoms, alkyl acrylates or alkyl alkylacrylates of 1 to about 10 carbon atoms, or blends thereof. Preferred E/Y copolymers are ethylene/acrylic acid copolymers or ethylene/methacrylic acid copolymers, and preferred E/X/Y terpolymers are ethylene/methyl acrylate/acrylic acid terpolymers, ethylene/n-butyl acrylate/methacrylic acid terpolymers, or ethylene/isobutyl-acrylate/methacrylic acid terpolymers.

The copolymer or terpolymer preferably has an acid content of from about 1% to about 30% by weight, a melt flow rate of from about 1 g/10-min to about 500 g/10-min, a water vapor transmission rate ("WVTR") of from about 0.01 to about 0.9 g·mm/m²/day at 38° C. and 90% relative humidity, a flexural modulus of from about 5,000 psi to about 55,000 psi, and a material hardness of from about 20 Shore D to about 65 Shore D. The non-ionomeric composition preferably has a flexural modulus of at least about 30,000 psi, and a material hardness of at least about 55 Shore D. The copolymer or terpolymer may be present in an amount of from about 5% to about 95% by weight of the non-ionomeric composition.

The stiffening polymer may be homopolymeric or copolymeric, and comprises polyamides, single-site catalyzed polymers, metallocene-catalyzed polymers, polyesters, poly(ethylene terephthalate), poly(butylene terephthalate), poly(propylene terephthalate), poly(trimethylene terephthalate), poly(ethylene naphthenate), polystyrene polymers, poly(styrene-co-maleic anhydride), acrylonitrile-butadiene-styrene, poly(styrene sulfonate), polyethylene styrene, grafted polypropylenes, grafted polyethylenes, polyvinyl chlorides; grafted polyvinyl chlorides; polyvinyl acetates having less than about 9% of vinyl acetate by weight, polycarbonates, blends of polycarbonate and acrylonitrile-butadiene-styrene, blends of polycarbonate and polyurethane, polyvinyl alcohols, polyvinyl alcohol copolymers, polyethers, polyarylene ethers, polyphenylene oxides; block copolymers of alkenyl aromatics with vinyl aromatics and polyamic esters, polyimides, polyetherketones, polyamideimides, or blends thereof. Preferably, the stiffening polymer is compatibilized with at least one grafted or copolymerized functional group such as maleic anhydride, amine, epoxy, isocyanate, hydroxyl, carbonate, sulfonate, phosphonate, or a combination thereof. The stiffening polymer may be present in an amount of from about 95% to about 5% by weight of the non-ionomeric composition.

The non-ionomeric acid polymer can be an E/Y copolymer or an E/X/Y terpolymer. E is an olefin such as ethylene. Y is a carboxylic acid such as acrylic, methacrylic, crotonic, maleic, fumaric, itaconic acid, or combinations thereof. X is a softening comonomer, such as vinyl esters of aliphatic carboxylic acids wherein the acid has 2 to about 10 carbon atoms, alkyl ethers wherein the alkyl group has 1 to about 10 carbon atoms, alkyl acrylates wherein the alkyl group has 1 to about 10 carbon atoms, or alkyl alkylacrylates such as alkyl methacrylates wherein the alkyl group has 1 to about 10 carbon atoms. Suitable softening comonomers X include vinyl acetate, methyl acrylate, methyl methacrylate, ethyl acrylate, ethyl methacrylate, iso-butyl acrylate, n-butyl acrylate, butyl methacrylate, or the like. Specific examples of the non-ionomeric acid copolymer include ethylene/acrylic acid copolymers ("EAA") and ethylene/methacrylic acid copolymers ("EMAA"). Examples of the non-ionomeric acid terpolymer are ethylene/methyl acrylate/acrylic acid terpolymers ("EMAAA"), ethylene/n-butyl acrylate/methacrylic acid terpolymers, and ethylene/isobutyl acrylate/methacrylic acid terpolymers. Commercially, EAA resins are available from Dow Chemical under the tradename of Primacor® and from ExxonMobil Chemical under the trade name of Escor®, EMAA resins are available from E.I. du Pont de Nemours and Company under the tradename of Nucrel®, and EMAAA resins are available from ExxonMobil Chemical under the trade name of Escor® AT.

Preferably, the acid content within the non-ionomeric acid copolymers or terpolymers ranges from about 1% to about 30% by weight, more preferably from about 3% to about 25%, and most preferably from about 5% to about 20%. Such non-ionomeric acid copolymers and terpolymers typically have high MFR, preferably ranging from about 1 g/10-min to about 500 g/10-min, more preferably from about 3 g/10-min to about 75 g/10-min, and most preferably from about 3 g/10 min to about 50 g/10 min. For example, EMAA resins such as Nucrel® 599 and 2940, both available from DuPont, have a respective acid content of 10% and 19% by weight, and a respective MFR of 500 g/10-min and 395 g/10-min. In comparison to Surlyn® D ionomers (MFR about 1-14 g/10-min), EMAA resins clearly have superior flow characteristic under heat.

In particular, the suitable non-ionomeric acid copolymers and terpolymers have a flexural modulus of preferably from about 5,000 psi to about 55,000 psi, more preferably from about 10,000 psi to about 30,000 psi. The non-ionomeric acid copolymers and terpolymers also has a material hardness of preferably from about 20 Shore D to about 65 Shore D, more preferably from about 40 Shore D to about 65 Shore D. The non-ionomeric acid copolymers and terpolymers further have a WVTR of from about 0.01 to about 0.9 g·mm/m²/day at 38° C. and 90% relative humidity. Other choices for the non-ionometric acid copolymers and terpolymers are known to one of ordinary skill in the art, and include those disclosed in U.S. Pat. Nos. 6,124,389; 5,981,654; 5,516,847; and 5,397,840, all of which are incorporated by reference in their entirety.

The intermediate cover may also be formed from or include impact modified, non-ionomeric thermoplastic polycarbonate/polyester copolymers or blends thereof. These copolymers or blends thereof have increased durability, improved impact resistance, and relatively lower flexural modulus. In one embodiment, the impact modified thermoplastic polycarbonate/polyester copolymer or blend for use in the intermediate cover layers has a flexural modulus of less than about 100,000 psi, preferably less than about 80,000 psi. More preferably, the impact modified thermoplastic polycarbonate/polyester copolymer or blend thereof has a flexural modulus between about 50,000 and about 70,000 psi. Flexural modulus as used herein is measured in accordance with ASTM method D-6272-02, Procedure B, a Test speed 0.5 in/min.

Preferred thermoplastic polycarbonate/polyester copolymers or blends thereof include, but are not limited to, polycarbonate/poly(butylene terephthalate) (PC/PBT). Suitable PC/PBT are commercially-available under the tradenames Xylex® and Xenoy® from General Electric Corporation of Pittsfield, Mass., or Ultradur® from BASF or Makroblend® from Bayer. Xylex®-type chemistries, such as those disclosed in U.S. Pat. No. 7,358,305, the disclosure of which is incorporated herein in its entirety by reference thereto, are the most preferred intermediate cover layer materials.

The PC/PBT blend may also be modified by blending with, for example, acrylonitrile butadiene styrene (ABS) plastics. Other suitable polymers that can be used as stand alone or along with the polycarbonate/polyester copolymers and blends in accordance with this invention include, but are not limited to:

1) Polyesters, such as polybutylene terephthalate (PBT) commercially available as Crastin® from DuPont; polyethylene terephthalate, such as DuPont Rynite®; and rigid Hytrel® grades from DuPont, such as Hytrel® 3078, 4068, 5556, 6356, 7246, and 8238. Hytrel® is a block copolymer of a crystalline hard segment (i.e., PBT) and an amorphous soft segment (i.e., a polyether, such as THF). DuPont Thermx® PCT polyester is also a suitable material and is based on poly(cyclohexene-dimethylene terephthalate) chemistry.

Other suitable polyester resins include crystalline polyester resins such as polyester resins derived from an aliphatic or cycloaliphatic diol, or mixtures thereof, containing from about 2 to 10 carbon atoms and at least one aromatic dicarboxylic acid. Preferred polyesters are derived from an aliphatic diol and an aromatic dicarboxylic acid. The polyester resin may comprise one or more resins selected from linear polyester resins, branched polyester resins and copolymeric polyester resins. Suitable linear polyester resins include polyalkylene phthalates, such as polyethylene terephthalate, polybutylene terephthalate, and polypropylene terephthalate; polycycloalkylene phthalates, such as polycyclohexanedimethanol terephthalate; polyalkylene naphthalates, such as polybutylene-2,6-naphthalate and polyethylene-2,6-naphthalate; and polyalkylene dicarboxylates, such as polybutylene dicarboxylate.

Preferably, copolymeric polyester resins include polyesteramide copolymers, cyclohexanedimethanol-terephthalic acid-isophthalic acid copolymers and cyclohexanedimethanol-terephthalic acid-ethylene glycol copolymers. The polyester component can, without limitation, comprise the reaction product of a glycol portion comprising 1,4-cyclohexanedimethanol and ethylene glycol, wherein the ethylene glycol is greater than 60 mole percent based on the total moles of 1,4-cyclohexanedimethanol and ethylene glycol with an acid portion comprising terephthalic acid, or isophthalic acid or mixtures of both acids.

The copolyester may also be a copolyester where the glycol portion has a predominance of ethylene glycol over 1,4-cyclohexanedimethanol, preferably is about greater than 60 molar percent of ethylene glycol based on the total mole percent of ethylene glycol and 1,4-cyclohexanedimethanol, and the acid portion is terephthalic acid. In another embodiment of the present invention the polyester comprises structural units derived from terephthalic acid and a mixture of 1,4-cyclohexane dimethanol and ethylene glycol, wherein said ethylene glycol is greater than about 75 mole percent based on total moles of 1,4-cyclohexane dimethanol and ethylene glycol. In another embodiment, the polyester resin has an intrinsic viscosity of from about 0.4 to about 2.0 dL/g as measured in a 60:40 phenol/tetrachloroethane mixture at 23-30° C.

The polyesters may also be derived from structural units comprising xylene glycol or, alternatively, from structural units comprising at least one of o-xylene glycol, m-xylene glycol, and p-xylene glycol. Preferably, the polyester is derived from structural units comprising p-xylene glycol. The xylene glycol should be present in an amount at least greater than about 40 mole percent, more preferably from about 50 to 100 mole percent, most preferably about 100 mole percent.

The polyester may optionally comprise straight chain, branched, or cycloaliphatic diols containing from 2 to 12 carbon atoms. Examples of such diols include but are not limited to ethylene glycol; propylene glycol, such as 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures thereof. The diol may also include glycols, such as ethylene glycol, propylene glycol, butanediol, hydroquinone, resorcinol, trimethylene glycol, 2-methyl-1,3-propane glycol, 1,4-butanediol, hexamethylene glycol, decamethylene glycol, 1,4-cyclohexane dimethanol, or neopentylene glycol. Chemical equivalents to the diols include esters, such as dialkylesters, diaryl esters, and the like.

The polyester may optionally comprise polyvalent alcohols which include, but are not limited to, an aliphatic polyvalent alcohol, an alicyclic polyvalent alcohol, and an aromatic polyvalent alcohol, including ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiroglycol, tricyclodecanediol, tricyclodecanedimethanol, m-xylene glycol, o-xylene glycol, 1,4-phenylene glycol, bisphenol A, lactone polyester and polyols. A resin obtained by capping the polar group in the end of the polymer chain using an ordinary compound capable of capping an end may also be used.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. The polyesters are preferably a polyether ester block copolymer consisting of a thermoplastic polyester as the hard segment and a polyalkylene glycol as the soft segment.

The polyester can be present in the composition at about 1 to about 99 wt %, based on the total weight of the composition. Within this range, it is preferred to use at least about 25 wt %, more preferably at least about 30 wt % of the polyester. Preferred polyesters have an intrinsic viscosity (as measured in 60:40 solvent mixture of phenol/tetrachloroethane at 25° C.) ranging from about 0.1 to about 1.5 dL/g. Polyesters branched or unbranched and generally will have a weight average molecular weight of from about 5,000 to about 150,000, preferably from about 8,000 to about 95,000 as measured by gel permeation chromatography using 95:5 weight percent of chloroform:hexafluroisopropanol mixture. Other suitable materials include thermoplastic aliphatic and aromatic polycarbonates and copolymers thereof.

2) Polyester blends comprising polyamides having at least one terminal acid group, such as those comprising (A) about 99.98 to about 95 wt % of a polyester which comprises (1) a dicarboxylic acid component comprising repeat units from at least 85 mole percent terephthalic acid; and (2) a diol component repeat unit from at least 85 mole percent ethylene glycol, based on 100 mole percent dicarboxylic acid and 100 mole percent diol; and (B) a polyamide wherein at least 50% of the polyamide end groups are acid groups. The polyester (A), is typically selected from polyethylene terephthalate, polyethylene naphthalenedicarboxylate or copolyesters thereof. The acid component of polyester (A) contains repeat units from at least about 80 mole percent terephthalic acid, naphthlenedicarboxylic acid or mixtures thereof and at least about 85 mole percent ethylene glycol, based on 100 mole percent dicarboxylic acid and 100 mole percent diol.

3) Polyamides are another preferred intermediate cover layer material. Nylon 11, 12 and copolymers and toughened versions are also preferred, such as those disclosed in U.S. Pat. No. 6,800,690, the disclosure of which is incorporated herein in its entirety by reference thereto. Rigid grades of Pebax® poly(amide-ester or amide-ether) are also suitable materials. Other polymers include polyimides, polyether-ether ketones, and liquid crystalline polymers. Filled or reinforced versions of any of these materials are also suitable. Sorona®, commercially-available from DuPont, is another preferred intermediate cover layer material. DuPont Sorona® EP thermoplastic polymers contain between 20% and 37% renewably sourced material (by weight) derived from corn. The new material exhibits performance and molding characteristics similar to high-performance PBT (polybutylene terephthalate).

4) Compatibilized poly(arylene ether)/polyester compositions having stable phase morphology. The composition exhibits a unique combination of good heat resistance, dimensional stability, nominal strain at break and impact properties. Surprisingly it has been discovered that the amount of the disperse phase comprising poly(arylene ether) in relation to the amount of the total composition is critical to the formation of a stable morphology. The disperse phase comprising poly(arylene ether) is present in an amount that is less than or equal to 35 wt % based on the total weight of the composition. The impact modifier may reside in the disperse phase but may also be present at the interface between the phases. When the impact modifier resides in the disperse phase, the combined amount of impact modifier and poly(arylene ether) is less than 35 weight percent (wt %), based on the total weight of the composition. The exact amount and types or combinations of poly(arylene ether), impact modifier and polyester will depend, in part, on the requirements needed in the final blend composition. Most often, the poly(arylene ether) and impact modifier are present in an amount of 5 to 35 wt %, or, more specifically, 10 to 25 wt %, based on the total weight of the composition.

The poly(arylene ether) can comprise molecules having aminoalkyl-containing end group(s), typically located in an ortho position to the hydroxy group. Also frequently present are tetramethyl diphenylquinone end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising two or more of the foregoing polymers. Poly(arylene ether) includes polyphenylene ether comprising 2,6-dimethyl-1,4-phenylene ether units optionally in combination with 2,3,6-trimethyl-1,4-phenylene ether units.

At least a portion of the poly(arylene ether) is functionalized with a polyfunctional compound (functionalizing agent) such as a polycarboxylic acid or those compounds having in the molecule both (a) a carbon-carbon double bond or a carbon-carbon triple bond and b) at least one carboxylic acid, anhydride, amino, imide, hydroxy group or salts thereof. Examples of such polyfunctional compounds include maleic acid, maleic anhydride, fumaric acid, and citric acid. The poly(arylene ether) can be functionalized prior to making the composition or can be functionalized as part of making the composition. Furthermore, prior to functionalization the poly(arylene ether) can be extruded, for example to be formed into pellets. It is also possible for the poly(arylene ether) to be melt mixed with other additives that do not interfere with functionalization. Exemplary additives of this type include flame retardants, flow promoters, and the like.

In some embodiments the poly(arylene ether) can comprise 0.1 wt % to 90 wt % of structural units derived from a functionalizing agent. Within this range, the poly(arylene ether) can comprise less than or equal to 80 wt %, or, more specifically, less than or equal to 70 wt % of structural units derived from functionalizing agent, based on the total weight of the poly(arylene ether).

Examples of suitable polyesters are poly(allylene dicarboxylate)s, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use branched polyesters in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make branched polyester. Furthermore, it is sometimes desirable to have various concentrations of acid and hydroxyl end groups on the polyester, depending on the ultimate end-use of the composition.

Liquid crystalline polyesters having melting points less that 380° C. and comprising recurring units derived from aromatic diols, aliphatic or aromatic dicarboxylic acids, and aromatic hydroxy carboxylic acids are also useful. Mixtures of polyesters are also sometimes suitable.

The composition can comprise 40 to 90 wt % of the polyester, based on the total weight of the composition. Within this range the composition can comprise less than or equal to 80 wt %, or, more specifically, less than or equal to 75 wt %, or, even more specifically, less than or equal to 65 wt % polyester. Also within this range, the composition can comprise greater than or equal to 45 wt %, or, more specifically, greater than or equal to 50 wt % polyester.

The composition also comprises an impact modifier. In many embodiments the impact modifier resides primarily in the poly(arylene ether) phase. Examples of suitable impact modifiers include block copolymers; elastomers such as polybutadiene; random copolymers such as ethylene vinyl acetate; and combinations comprising two or more of the foregoing impact modifiers.

Exemplary block copolymers include A-B diblock copolymers and A-B-A triblock copolymers having one or two blocks A, which comprise structural units derived from an alkenyl aromatic monomer, for example styrene; and a rubber block, B, which generally comprises structural units derived from a diene such as isoprene or butadiene. The diene block may be partially hydrogenated. Mixtures of these diblock and triblock copolymers are especially useful.

Suitable A-B and A-B-A copolymers include, but are not limited to, polystyrene-polybutadiene; polystyrene-poly (ethylene-butylene); polystyrene-polyisoprene; polystyrene-poly(ethylene-propylene); poly(alpha-methylstyrene)-polybutadiene; poly(alpha-methylstyrene)-poly(ethylene-butylene); polystyrene-polybutadiene-polystyrene; polystyrene-poly(ethylene-butylene)-polystyrene; polystyrene-polyisoprene-polystyrene; polystyrene-poly(ethylene-propylene)-polystyrene; poly(alpha-methylstyrene)-polybutadiene-poly(alpha-methylstyrene); as well as selectively hydrogenated versions thereof, and the like, as well as combinations comprising two or more of the foregoing impact modifiers. Such A-B and A-B-A block copolymers are available commercially from a number of sources, including Phillips Petroleum under the trademark SOLPRENE, Kraton Polymers, under the trademark KRATON, Dexco under the trademark VECTOR, and Kuraray under the trademark SEPTON.

In addition to the poly(arylene ether), polyester, and impact modifier, the composition is made using a polymeric compatibilizer having an average of greater than or equal to 3 pendant epoxy groups per molecule. In some embodiments the polymeric compatibilizer has an average of at least 8 pendant epoxy groups per molecule.

Illustrative examples of suitable compatibilizers include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of two or more of the foregoing. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, the acrylic ester may be used in an amount of 15 wt % to 35 wt % based on the total amount of monomer used in the copolymer. When present, vinyl acetate may be used in an amount of 4 wt % to 10 wt % based on the total amount of monomer used in the copolymer. Illustrative examples of suitable compatibilizers comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers;

5) Polycarbonate resins derived from bisphenol A and phosgene or a blend of two or more polycarbonate resins. The preferred polycarbonates are high molecular weight aromatic carbonate polymers have an intrinsic viscosity (as measured in methylene chloride at 25° C.) ranging from about 0.30 to about 1.00 dL/g. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups. Other polycarbonates useful in the invention are disclosed in U.S. Pat. No. 7,345,116, which is incorporated herein, in its entirety, by reference thereto.

The preferred polycarbonates are preferably high molecular weight aromatic carbonate polymers have an intrinsic viscosity (as measured in methylene chloride at 25° C.) ranging from about 0.30 to about 1.00 dL/g. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups. Typically such polyester resins include crystalline polyester resins such as polyester resins derived from an aliphatic or cycloaliphatic diol, or mixtures thereof, containing from about 2 to 20 carbon atoms and at least one aromatic dicarboxylic acid. Preferred polyesters are derived from an aliphatic diol and an aromatic dicarboxylic acid. The polyester resins are typically obtained through the condensation or ester interchange polymerization of the diol or diol equivalent component with the diacid or diacid chemical equivalent component.

Other preferred polycarbonates are disclosed in U.S. Patent Application Serial No. 2007/0173618, the disclosure of which is incorporated herein in its entirety by reference thereto.

6) Polycarbonate/polyester blends, such as polymers including (A) about 1 to 99 wt % of at least one polycarbonate (A) comprising: (1) a diol component comprising about 90 to 100 mole percent 4,4'-isopropylidenediphenol residues, and (2) 0 to about 10 mole percent modifying diol residues, where the total mole percent of diol residues is equal to 100 mole percent; and (B) about 99 to 1 wt % of at least one polyester (B) comprising (1) diacid residues comprising about 70 to 100 mole percent dicarboxylic acid units, such as terephthalic acid residues, isophthalic acid residues, or mixtures thereof; and 0 to about 30 mole percent of modifying dicarboxylic acid residues, wherein the total mole percent of diacid residues is equal to 100 mole percent; and (2) diol residues comprising about 40 to 99.9 mole percent 1,4-cyclohexanedimethanol residues, 0.1 to about 60 mole percent neopentyl glycol residues, and 0 to about 10 mole percent modifying diol residues having 3 to 16 carbons, wherein the total mole percent of diol residues is equal to 100 mole percent; and wherein the total weight percent of said polycarbonate (A) and polyester (B) is equal to 100 weight percent.

The term "polyester," as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. The term "residue," as used herein, means any organic structure incorporated into a polymer or plasticizer through a polycondensation reaction involving the corresponding monomer. The term "repeating unit," as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

Preferred polymer blends include at least one polyester(s) (B) comprising dicarboxylic acid residues, diol residues, and, optionally, branching monomer residues. The polyester(s) (B) included in the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 20 mole % isophthalic acid, based on the total acid residues, means the polyester contains 20 mole % isophthalic acid residues out of a total of 100 mole % acid residues. Thus, there are 20 moles of isophthalic acid residues among every 100 moles of acid residues. In another example, a polyester containing 10 mole % ethylene glycol, based on the total diol residues, means the polyester contains 10 mole % ethylene glycol residues out of a total of 100 mole % diol residues. Thus, there are 10 moles of ethylene glycol residues among every 100 moles of diol residues.

Other polymer blends include polyester(s) (B) and polycarbonates (A) that are miscible and which typically exhibit only a glass transition temperature ($T_g$) as a blend, as measured by well-known techniques such as, for example, differential scanning calorimetry. The polyesters utilized in the present invention are amorphous or semi-crystalline and have glass transition temperatures of about 40 to 140° C., preferably about 60 to 100° C.

Suitable diacids include about 70 to 100 mole percent, preferably 80 to 100 mole percent, more preferably, 85 to 100 mole percent, even more preferably, 90 to 100 mole percent, and further 95 to 100 mole percent, of dicarboxylic acids, such as terephthalic acid residues, isophthalic acids, or mixtures thereof. The polyester may comprise about 70 to about 100 mole % of diacid residues from terephthalic acid and 0 to about 30 mole % diacid residues from isophthalic acid, alternatively about 0.1 to 30 mole percent isophthalic acid.

Polyester (B) may further include from about 0 to about 30 mole percent, preferably 0 to 10 mole percent, and more preferably, 0.1 to 10 mole percent of the residues of one or more modifying diacids (not terephthalic acid and/or isophthalic acid). Examples of modifying diacids containing that may be used include but are not limited to aliphatic dicarboxylic acids, alicyclic dicarboxylic acids, aromatic dicarboxylic acids, or mixtures of two or more of these acids. Specific examples of modifying dicarboxylic acids include, but are not limited to, one or more of succinic acid, glutaric acid, adipic acid, suberic acid, sebacic acid, azelaic acid, dimer acid, sulfoisophthalic acid. Additional examples of modifying diacids are fumaric, maleic, itaconic, 1,3-cyclohexanedicarboxylic, diglycolic, 2,5-norbornanedicarboxyclic, phthalic acid, diphenic, 4,4'-oxydibenzoic, and 4,4'-sulfonyldibenzoic. Other examples of modifying dicarboxylic acid residues include but are not limited to naphthalenedicarboxylic acid and 1,4-cyclohexanedicarboxylic acid. Any of the various isomers of naphthalenedicarboxylic acid or mixtures of isomers may be used, but the 1,4-, 1,5-, 2,6-, and 2,7-isomers are preferred. Cycloaliphatic dicarboxylic acids such as, for example, 1,4-cyclohexanedicarboxylic acid may be present at the pure cis or trans isomer or as a mixture of cis and trans isomers. Dicarboxylic acids having 2 to 20 carbon atoms, preferably 2 to 18 carbon atoms, and more preferably, 2 to 16 carbon atoms, are included in one embodiment of the invention.

The polyester (B) also comprises diol residues that may comprise about 45 to about 95 mole percent of the residues of 1,4-cyclohexanedimethanol, 55 to about 5 mole percent of the residues of neopentyl glycol, and 0 to 10 mole percent of one or more modifying diol residues. As used herein, the term "diol" is synonymous with the term "glycol" and means any dihydric alcohol.

Alternatively, the blends typically include from about 1 to 99 weight percent, preferably 0.1 to 75 wt %, more preferably, 0.1 to 50 wt %, preferably 10 to 30 wt %, preferably 15 to 30 wt %, of at least one polycarbonate (A) comprising: (1) a diol component comprising about 90 to 100 mole percent 4,4'-isopropylidenediphenol residues; and (2) about 0 to 10 mole percent modifying diol residues; wherein the total mole percent of the diol residues is equal to 100 mole percent; and comprise from about 99 to 1 weight percent, preferably 99.9 to 25 weight percent, more preferably, 0.99.9 to 50 weight percent, and even more preferably, 75 to 50 weight percent of at least one polyester (B), wherein the total weight percent of polycarbonate (A) and polyester (B) is equal to 100 weight percent.

Suitable polycarbonates are typically derived from bisphenol A. Examples of suitable bisphenol A polycarbonates include the materials marketed under the tradenames LEXAN, available from the General Electric Company, and MAKROLON 2608, available from Bayer, Inc. The polycarbonate portion of the blends preferably has a diol component containing about 90 to 100 mole percent bisphenol A units, and 0 to about 10 mole percent can be substituted with units of other modifying aliphatic or aromatic diols, besides bisphenol A, having from 2 to 16 carbons. The polycarbonate can contain branching agents, such as tetraphenolic compounds, tri-(4-hydroxyphenyl) ethane, and pentaerythritol triacrylate. It is preferable to have at least 95 mole percent of diol units in the polycarbonate being bisphenol A.

The above blends preferably include from about 10 to 90 wt % of the polycarbonate component and 90 to about 10 wt % of the polyester component. The composition may also include about 25 wt % to 75 wt % polycarbonate and 75 wt % to 25 wt % polyester.

The intermediate layers of the golf balls of the present invention are preferably formed from stiff thermoplastic polyurethanes or polyureas. The molecular structure of a typical thermoplastic urethane (TPU) consists of alternating high-melting "hard" urethane segments and liquid-like "soft" segments.

Hard segments are typically the reaction product of an aromatic or aliphatic diisocyanate and a low molecular weight, chain-extending dialcohol or diol. Suitable diisocyanates include alkyl diisocyanates, arylalkyl diisocyanates, cycloalkylalkyl diisocyanates, alkylaryl diisocyanates, cycoalkyl diisicyanates, arly diisocyanates, cycloalkylaryl diisocyanates, all of which may be further substituted with oxygen, and mixtures thereof. The chain extender of the hard segment used in the preparation of the copolymers may be an aliphatic polyol or an aliphatic or aromatic polyamine such as known for preparing polyurethanes and polyureas. The polyol for the hard segment may be alkylene, cycloalkylene, arylene diols, triols, tetraalcohols and pentaalcohols, and mixtures thereof. The polyamine of the hard segment may be alkyl, cycloalkyl, and aryl amines that may be further substituted with nitrogen, oxygen, halogen, complexes thereof with alkali metal salts and mixtures thereof.

The hard segment can be either aromatic or aliphatic. Aromatic TPUs are commonly based on methylene diphenyl 4,4'-diisocyanate ("MDI") while aliphatic TPUs are commonly based on dicyclohexylmethane diisocyanate ("$H_{12}$MDI").

Soft segments may be built from polyols with terminal hydroxyl (—OH) groups. The hydroxyl creates a urethane group, while the reaction between isocyanates and existing urethane groups will form allophanate groups that can produce minor amounts of covalent cross-linking in TPUs. When a TPU is heated, the hydrogen-bonded hard segments and any allophanate cross-links, both of which hold the polymer together at its use temperature, dissociate to allow the polymer to melt and flow. Dissolution in a polar solvent can also disrupt the hydrogen bonds that hold together the hard segments on adjacent chains. Once these virtual cross-links are broken, the polymer can be fabricated into golf balls. Upon cooling or solvent evaporation, the hard segments de-mix from the soft segments to re-associate by hydrogen bonding. This restores the original mechanical properties of the polyurethane elastomer. Polyether and polycarbonate TPUs generally have excellent physical properties, combining high elongation and high tensile strength, albeit having fairly high-modulus. Varying the hard segment of a TPU during synthesis can produce a whole family of polymers of related chemistry but with a wide range of hardness, modulus, tensile-strength properties and elongation. In the fabrication of golf balls, the use of TPUs of different hardness values within a single family provides considerable versatility in manufacturing.

The molecular structure of a generic thermoplastic polyurea consists of a rigid "hard segment" and a flexible "soft segment. The hard segments are typically formed from the reaction product of an aromatic or aliphatic diisocyanate with an aromatic or aliphatic chain-extending diamine to form urea linkages. The soft segment may be built from amine-terminated polyethers, polyesters, polycaprolactones, polycarbonates, or other suitable long chain backbone. The reaction product of the soft segment with the hard segment, i.e., diisocyanates, produces urea linkages.

Other suitable TPUs include, but are not limited to, silicone-urethane materials such as an aromatic or aliphatic urethane hard segment with a silicone based soft segment to create a thermoplastic silicone-urethane copolymer, combining the above hard and soft segments with a polycarbonate to form a thermoplastic silicone-polycarbonate urethane copolymer, or combining the above hard and soft segments with a polyethylene oxide to form a thermoplastic silicone-polyethyleneoxide urethane copolymer.

Thermoplastic silicone-polyether urethane copolymers available today include PurSil™; silicone-polycarbonate urethane copolymers available include CarboSil™; and silicone-polyethylene oxide urethane copolymers include Hydrosil™. U.S. Pat. Nos. 5,863,627 and 5,530,083, which are incorporated by reference herein in their entirety, describe how PurSil™ CarboSil™ and Hydrosil™ are processed. The thermoplastic elastomers containing silicone in the soft segment, such as PurSil™, are prepared through a multi-step bulk synthesis. In this synthesis the hard segment is an aromatic urethane MDI (4,4'-diphenylmethane diisocynanate-butanediol) with a low molecular weight glycol extender butanediol and the soft segment is comprised of polytetramethylene oxide including polydimethylsiloxane.

In addition to polydimethylsiloxane, other suitable surface-modifying end groups, which may be used alone or in combination with one another, include hydrocarbons, fluorocarbons, fluorinated polyethers, polyalkylene oxides, various sulphonated groups, and the like. Surface-modifying end groups are surface-active oligomers covalently bonded to the base polymer during synthesis. When the aromatic or aliphatic urethane hard segment is combined with a hydrocarbon soft segment surface-modifying end group, a hydrocarbon-polyurethane is produced and has excellent properties for use in golf balls.

Thermoplastic polycarbonate-urethane copolymers are also suitable materials for the intermediate layers of the present invention and have good oxidative stability, excellent mechanical strength, and abrasion resistance. Commercially-available thermoplastic polycarbonate-polyurethane TPUs include, but are not limited to, Bionate® polycarbonate-urethanes, such as Bioante® 55D and 75D produced by the Polymer Technology Group of Berkeley, Calif.

Bionate® polycabonate-urethane is a thermoplastic elastomer formed as the reaction product of a hydroxyl terminated polycarbonate, an aromatic diisocyanate, and a low molecular weight glycol used as a chain extender. In a preferred embodiment, polycarbonate glycol intermediate, poly (1,6-hexyl-1,2-ethyl carbonate) diol, is the condensation product of 1,6-hexanediol with cyclic ethylene carbonate. The polycarbonate macroglycol is reacted with aromatic isocyanate, 4,4'-methylene bisphenyl diisocyanate, and chain extended with 1,4-butanediol.

Ultimate tensile strengths for Bionate® compounds can exceed 10,000 psi. The ultimate elongation of the present invention is about 20 to 1000% with a preferred elongation of at least about 400 to about 800%. The initial modulus of the materials suitable for the present invention is about 300 to 150,000 psi, and preferably between about 10,000 and about 80,000 psi.

Other suitable commercially-available TPUs include the E-Series TPUs, such as D 60 E 4024 from Huntsman Polyurethanes of Germany, and TPUs sold under the tradenames of Texin® 250, Texin® 255, Texin® 260, Texin® 270, Texin® 950U, Texin® DP7-1202, Texin® 970U, Texin® 3203, Texin® 4203, Texin® 4206, Texin® 4210, Texin® 4215, and Texin® 3215, and Desmopan® 453 from Bayer of Pittsburgh, Pa.

U.S. Pat. Nos. 6,855,793, 6,739,987, and 7,037,217 disclose preferred polycarbonate-polyurethane copolymers, silicone-polyurethane copolymers, and silicone-polyurethanes, respectively, the disclosures of which are incorporated herein, in their entirety, by reference thereto.

The TPUs (both thermoplastic polyurethanes and thermoplastic polyureas) of the invention are also readily blended with other thermoplastic polymers, such as polycarbonates, polyvinyl chlorides, acrylonitrile-butadiene-styrenes, and polyamides. Any TPU blend, alloy or copolymer, is also suitable for the intermediate layers of the invention, such as TPU/polycarbonates; TPU/ABS; TPU/SMA (styrene-maleic anhydride); TPU/styrene-butadiene or styrene-ethylene-butadiene block copolymers; TPU/polyolefins, such as polypropylene, polyethylene, ethylene-propylene rubber ("EPR"), ethylene-propylene-diene monomer ("EPDM"), and ethylene-vinyl acetate; or TPU/modified polyolefins, such as DuPont Fusabond® functionalized (typically by maleic anhydride grafting) metallocene-catalyzed polyolefins or any other polar-group modified ethylene copolymer, such as Dow Amplify® IO, GR, or EA grade polymers.

Thermoplastic transparent polyamides are also suitable materials for use in the intermediate (or inner cover) layers of the invention. These compositions comprise at least one transparent polyamide. The transparent polyamide by itself, may comprise a homopolymer, copolymers including block copolymer, or a blend or alloy thereof. In one preferred embodiment, the composition comprises an acid anhydride-modified polyolefin and/or plasticizer, as discussed below.

The term "polymer" refers to, but is not limited to, oligomers, homopolymers, copolymers, terpolymers, and the like. The polymers may have various structures including, but not limited to, regular, irregular, alternating, periodic, random, block, graft, linear, branched, isotactic, syndiotactic, atactic, and the like. Polyamide polymers include, but are not limited to, polyamide copolymers (copolyamides) having two types of monomers, copolymers having three types of monomers, and copolymers having more than three types of monomers. Blends and alloys of polyamides also may be made in accordance with this invention as described further below.

The term "transparent," as it relates to the polyamides herein, describes a material having a light transmission of 50% or greater, as measured with test procedure ISO 13468 using a 2-mm thick sample measured at a wavelength of 560 nm. In general, transparent polyamides are classified as having a microcrystalline structure or amorphous structure. Both microcrystalline and amorphous transparent polyamides may be used in the present invention. It should be understood that while a transparent polyamide is preferably included in the composition, the final composition may have a transparent, translucent, or opaque optical nature. The final composition may contain various additives including fillers, coloring agents, dyes, pigments, and the like, that effect the optical nature of the composition. The term "translucent," as it relates to the polyamides herein, describes a material having a light transmission of 1-49%, as measured with test procedure ISO 13468 using a 2-mm thick sample measured at a wavelength of 560 nm. The transparent polyamides of the present invention preferably have a light transmission lower limit of about 50% or greater, more preferably 54%, 58%, 60%, 65%, 68% or 70% or greater, and an upper limit of 100% or less, more preferably 95%, 94%, 92%, 90%, 84%, 80%, or 75% or less, as measured with test procedure ISO 13468 using a 2-mm thick sample measured at a wavelength of 560 nm.

Commercially-available transparent polyamides include, but are not limited to, copolyamides such as Platamid® 8020; semi-aromatic transparent polyamides such as Rilsan® Clear G170; transparent polyamides such as Rilsan® G120 Rnew; Rilsan®G830 Rnew and G830 L Rnew; Rilsan® G850; Rilsan® Clear G350 and G350L; Rilsan® G300 HI; and transparent polyamides that are partly based on bio-based raw materials such as Rilsan® Clear G830, all of which are available from Arkema, Inc. of King of Prussia, Pa., may be used. Other suitable examples include Ultramid® polyamides, available from BASF; and Zytel and Dartek nylon resins, available from DuPont. EMS-Chemie AG of Switzerland supplies different grades of transparent polyamides under the Grilamid mark, including; Grilamid® TR 30, TR55, TR90, XE 3997, XE 4028 grades, and these polyamides may be used per this invention. Grivory® G and GTR transparent polyamides also are available from EMS-Chemie AG and may be used in the compositions of this invention. Other suitable polyamides include Trogamid® and Vestamid® grades available from DeGussa AG of Marl, Germany; Kopa® grades available from Kolon; Dureathan® grades available from Lanxess AG of Cologne, Germany; Arlen® grades available from Mitsui Japan; transparent amorphous nylons such as Ashlene® D870 and D870L available from Ashley Polymers of Brooklyn, N.Y.; Radici Radilon® CST copolyamides; Shakespeare Isocor® CN30XT and CN30BT nylon 610 resins by Jarden Applied Materials of Columbia, S.C.; Toyobo Glamide® T-714E nylons; and TP Composites Elastoblend® PA12 CL nylons. Transparent polyamides including, but not limited to, polyether-amide, polyester-amide, polyether-ester-amide block copolymers, are particularly suitable for use in the invention herein, and more particularly, the transparent polyamide copolymers, Rilsan® Clear G300 HI, Pebax® Clear 300, and Pebax® Clear 400 available from Arkema, Inc. of King of Prussia, Pa., are particularly effective.

Examples of transparent polyamides that may be used in the intermediate layers of the present invention also are described in the patent literature. For example, transparent homopolyamides and copolyamides which are amorphous or which exhibit a slight crystallinity such as those described in U.S. Patent Application Publication No. 2010/0140846; and U.S. Pat. Nos. 6,376,037 and 8,399,557. Also, amorphous transparent or translucent polyamides that may be formed from the condensation of diamines with dicarboxylic acids or lactams; and blends or alloys of two or more different polyamides, as described in U.S. Patent Application Publication No. 2012/0223453, may be used. Polyamide copolymers such as a copolymers containing polyether blocks and polyamide blocks as described in U.S. Patent Application Publication No. 2013/0202831, may be used. The polyamide copolymers described in the '831 Publication are resistant to a high-velocity impact of at least 76.2 m/s (250 ft/s) according to the EN 166 standard, have a Charpy notched impact strength of at least 90 kJ/m2 according to the ISO 179 leU standard, and preferably have a chemical resistance such that they are capable of deforming, in flexion, by immersion in a solvent according to the ISO 22088-3 standard by at least 3% without breaking; that is light, having a density of less than 1.05 g/cm$^3$ measured according to the ISO 1183 D standard; and that is flexible and has an elastic modulus of less than 1000 MPa, preferably of less than 800 MPa, measured according to the ISO 527-2:93-1BA standard. The disclosures of these patent and publications are incorporated herein by reference Transparent polyamides that may be used in accordance with this invention also include those polyamides described in U.S. Pat. Nos. 6,528,560; 6,831,136; 6,943,231; 8,309, 643; and 8,507,598; and U.S. Patent Application Publication No. 2010/0203275, the disclosures of which are hereby incorporated by reference.

In general, polyamides refer to high molecular weight polymers in which amide linkages (—CONH—) occur along the length of the molecular chain. Suitable polyamides for use in the intermediate layer compositions of the invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, Nylon 6, Nylon 6,6; Nylon 6,10; Nylon 11, and Nylon 12. Aliphatic and aromatic polyamides and blends thereof may be prepared in accordance with this invention.

In general, polyamide homopolymers and copolymers are suitable for use in this invention. The specific monomers, reaction conditions, and other factors will be selected based on the desired polyamide polymer to be produced. There are two common methods for producing polyamide homopolymers. In a first method, a compound containing one organic acid-type end group and one amine end group is formed into a cyclic monomer. The polyamide is then formed from the monomer by a ring-opening polymerization.

The second method involves the condensation polymerization of a dibasic acid and a diamine. In general, this reaction takes place as follows:

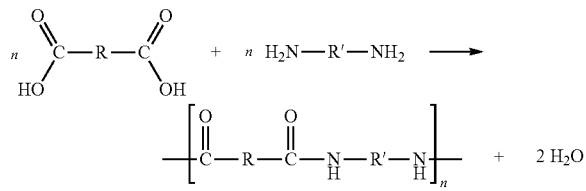

Suitable polyamides include nylon 4, Nylon 6, Nylon 7, Nylon 11, Nylon 12, Nylon 13, Nylon 4,6; Nylon 6,6; Nylon 6,9, Nylon 6,10; Nylon 6,12; Nylon 12,12; Nylon 13,13; and mixtures thereof. More preferred polyamides include Nylon 6, Nylon 11, Nylon 12, Nylon 4,6; Nylon 6,6; Nylon 6,9; Nylon 6,10; Nylon 6,12; Nylon 6/66; And Nylon 6/69 and mixtures thereof.

Compositions of Nylon 6, Nylon 6,6; Nylon 11, And Nylon 12 and copolymers and blends thereof are suitable in the present invention. More specifically, polyamide compositions having mechanical properties that do not significantly change after the composition has been exposed to moisture are particularly effective.

More particularly, as noted above, transparent polyamides are particularly suitable for use in the invention herein. Such transparent polyamides include transparent polyamide copolymers (copolyamides). For example, polyether-amide and polyester-amide block copolymers may be used. Such polyamide copolymers are described, for example, in the above-mentioned U.S. Patent Application Publication No. 2010/0140846; and U.S. Pat. Nos. 6,376,037 and 8,399,557. It should be understood that the term, "polyamide," as used in the present invention, is meant to include copolymers with polyamide blocks and polyether blocks, i.e., polyether block amide polymers, and the mixtures of these copolymers with the preceding polyamides. Polymers with polyamide blocks and polyether blocks result from the copolycondensation of polyamide sequences comprising reactive ends with polyether sequences comprising reactive ends, such as: a) polyamide sequences comprising diamine chain ends with polyoxyalkylene sequences comprising dicarboxylic chain ends, b) polyamide sequences comprising dicarboxylic chain ends with polyoxyalkylene sequences comprising diamine chain ends obtained by cyanoethylation and hydrogenation of α'Ω-dihydroxylated aliphatic polyoxyalkylene sequences, known as polyetherdiols, or c) polyamide sequences comprising dicarboxylic chain ends with polyetherdiols, the products obtained being, in this specific case, polyetheresteramides.

These polymers with polyamide blocks and polyether blocks, whether they originate from the copolycondensation of polyamide and polyether sequences prepared beforehand or from a one-stage reaction, exhibit, for example, Shore D hardness values that can be from 20 to 95 and advantageously between 25 and 85, more preferably 30 to 80, and even more preferably 35 to 78 and an intrinsic viscosity between 0.8 and 2.5, measured in meta-cresol at 25° C.

Whether the polyester blocks derive from polyethylene glycol, polyoxypropylene glycol or polyoxytetramethylene glycol, they are either used as is and copolycondensed with polyamide blocks comprising carboxylic ends or they are aminated, in order to be converted into polyetherdiamines, and condensed with polyamide blocks comprising carboxylic ends. They can also be mixed with polyamide precursors and a chain-limiting agent in order to form polymers with polyamide blocks and polyether blocks having statistically distributed units. Polymers with polyamide and polyether blocks are disclosed in U.S. Pat. Nos. 4,331,786; 4,115,475; 4,195,015; 4,839,441; 4,864,014; 4,230,838; and 4,332,920, the disclosures of which are incorporated herein by reference. The polyether can be, for example, a polyethylene glycol (PEG), a polypropylene glycol (PPG) or a polytetramethylene glycol (PTMG).

Blends of polyamides also may be used in accordance with this invention. For example, a blend of transparent polyamides or a blend of transparent and non-transparent polyamides may be used in accordance with this invention. In particular, a blend of transparent polyamide and a thermoplastic polyamide elastomer (typically a copolymer of polyamide and polyester/polyether) may be used. The polyamide elastomer may be transparent or non-transparent. Many polyamide elastomers comprise a hard polyamide segment (for example, Nylon 6, Nylon 6,6; Nylon 11, Nylon 12 and the like) and a polyether or polyester as a soft segment. Suitable polyamide elastomers that can be used to form the compositions of this invention include, for example. polyether-amide block copolymers, available from Arkema, Inc. of Columbs, France as Pebax® resins. In general, these block copolymers have thermoplastic properties and elastomeric properties.

In a particularly preferred version, blends of polyamide polymers as described in above-mentioned U.S. Pat. No. 8,399,557, are used to form the compositions of this invention. These transparent blends comprise, by weight, the total being 100%: (A) 1 to 99% of at least one constituent copolymer: exhibiting a high transparency such that the transmission at 560 nm through a sheet with a thickness of 2 mm is greater than 65%; exhibiting a glass transition temperature of at least 90° C.; and being amorphous or exhibiting a crystallinity ranging up to semicrystallinity; and comprising: (A1) amide units, including amide units produced from at least one cycloaliphatic diamine unit; and (A2) flexible ether units; (B) 99 to 1% of at least one constituent polymer chosen from: (Ba) semicrystalline copolyamides comprising amide units (Ba1) and comprising ether units (Ba2), wherein said semicrystalline copolyamides have a glass transition temperature (Tg) of less than 65° C.; and alloys based on such copolyamides (Ba); and (C) 0 to 50% by weight of at least one polyamide, copolyamide, or copolyamide comprising ether units other than those used in (A) and (B) above; and/or of at least one additive normal for thermoplastic polymers and copolymers; the choice of the units or monomers in the composition of (A), (B) and (C) and also the choice of the proportions of the said units or of the said monomers being such that the resulting blend or alloy exhibits a high transparency such that the transmission at 560 nm through a sheet with a thickness of 2 mm is greater than 50%.

The reaction products of the above-described components (A), (B), and (C), also may be used to form a polyamide composition suitable for use in the present invention.

One advantageous property of the transparent polyamides used to form the compositions of the present invention is that they exhibit a relatively high glass transition temperature (Tg). The transparent polyamides are relatively easy to process and can be molded to form different golf ball layers. The Tg, as reported herein, is measured according to Test Method ISO 11357 and reported in ° C. As the temperature of a polymer drops below the Tg, it behaves in an increasingly brittle manner. As the temperature rises above the Tg, the polymer becomes more rubber-like. Knowledge of Tg, therefore, is an important factor in the selection of materials for golf ball layer applications. In general, values of Tg well-below room temperature define the domain of elastomers and Tg values above room temperature define rigid, structural polymers. It has been found that preferred transparent polyamides exhibit a Tg in a range of about 30° C. to about 170° C., and has a lower range of about 35° C., 40° C., 50° C., or 60° C. and an upper range of about 70° C., 80° C., 90° C., 120° C., 140° C., or 150° C. In one preferred version, the Tg may be about 65° C., 75° C., 85° C., 91° C., 95° C., or 105° C. In an alternative embodiment, the transparent polyamide has a Tg in the range of about 75° C. to about 160° C., more preferably in the range of about 80° C. to about 95° C.

As used herein, the term "semi-crystalline" covers polyamides which have both a Tg and a melting point as determined by DSC. The term "amorphous" covers polyamides that do not have a melting point detected by DSC or a melting point with negligible intensity such that it does not affect the essentially amorphous nature of the polymer. The term "semi-crystalline," as used herein, relates to polymers that have both a melting exotherm and a glass transition as determined by DSC. The term "amorphous," as used herein, relates to polymers that have a glass transition but either do not exhibit a melting exotherm or exhibit a glass transition and a small or insignificant melting exotherm ($DH_f \leq 10$ J/g) as determined by DSC. The term, "micro-crystalline," as used herein, refers to semi-crystalline polymers in which the melting exotherm is determined by DSC. The term, "quasi-amorphous," as used herein, relates to polymers that the spherulite size is sufficiently small in order to maintain transparency.

The transparent polyamides also have high flexibility, toughness, impact-durability and stress-crack resistance. One advantageous property of the transparent polyamides used to form the compositions of the present invention is their relatively high Charpy impact-resistance. In general, impact testing refers to the energy required to break or deform a material. The Charpy impact test is a standardized high strain-rate test which determines the amount of energy absorbed by a material during fracture. This absorbed energy is a measure of a given material's notch toughness and acts as a tool to study temperature-dependent ductile-brittle transition. The test method standard is ISO 179/leA. Samples are conditioned for 15 days at 23° C. and 50% relative humidity. The test results herein are measured at either 23° C. or −30° C. and results are reported in kilojoules per meter squared. The higher the number, the tougher the material, with a no-break (NB) meaning that the test sample was flexible enough to withstand the impact without fracturing. High Charpy impact values are an important material property to consider when choosing a material for a layer in a golf ball, since a golf ball must withstand very high force impacts, such as those encountered when struck with a golf club. It is believed that the polyamide compositions herein comprising a transparent polyamide, preferably have a Charpy notched impact (at 23° C.) of from at least about 8 to No-Break (NB), and have a lower range of from about 10, 12, 14, 16, 18, 25, 30, or 40 kJ/m$^2$ to an upper limit ranging from about 80, 85, 90, or 94 kJ/m$^2$ to no-break. A preferred transparent polyamide composition comprises Rilsan Clear G300 HI, which has a Charpy notched impact value at 23° C. of 94 kJ/m$^2$, and a value at −30° C. of 19 kJ/m$^2$.

The polyamide compositions of this invention may further contain acid anhydride-modified polyolefins. Adding the acid anhydride-modified polyolefin helps improve the toughness and impact durability of the composition. In such materials, the polyolefin polymer is chemically modified with acid anhydride. That is, the polyolefin polymer is functionalized; it contains at least one acid anhydride group. In general, such acid anhydride groups may be grafted onto the polyolefin polymer backbone. Some examples of suitable acid anhydrides that may be used to functionalize the polyolefin include, but are not limited to, fumaric, nadic, itaconic, and clorendic anhydrides, and their substituted derivatives thereof.

Suitable olefin monomeric units that can be used to prepare the polyolefin polymer include, for example, ethylene, propylene, butene, hexene, heptene, octene, decene, and dodecene. Preferably, the monomeric unit contains from 2 to about 20 carbon atoms. The resulting polyolefin chains (polymer backbones) formed from these monomeric units include, for example, polyethylene, high density polyethylene (HDPE), low density polyethylene (LDPE), very low density polyethylene (VLDPE), polypropylene, polybutene, polyhexene, polyoctene, polydecene, and polydodecene, and copolymers and blends thereof. The resulting polyolefin polymer is functionalized with at least one acid anhydride moiety.

More particularly, the acid anhydride-modified polyolefin polymers used in this invention include copolymers such as, for example, ethylene-based copolymers, particularly ethylene-propylene (EP); ethylene-butene (EB); ethylene-hexene (EH); ethylene-octene (EO); styrene-ethylene/butylene-styrene (SEBS); ethylene-propylene diene monomer (EPDM); ethylene-vinyl acetate (EVA); and various ethylene-alkyl acrylate and ethylene-alkyl alkyl acrylate copolymers such as, for example, ethylene-methyl acrylate (EMA); ethylene-ethyl acrylate (EEA); ethylene-propyl acrylate (EPA); ethylene n-butyl acrylate (EBA) copolymers; and the like. Other polyolefin-based copolymers such as polypropylene and polybutene-based copolymers also can be used. These copolymers include random, block, and graft copolymers which have been functionalized with acid anhydride groups.

Examples of commercially-available acid anhydride polyolefins that can be used in accordance with this invention, include, but are not limited to, Amplify® GR functional polymers, available from the Dow Chemical Company; Fusabond® polymers, available from the DuPont Company; Kraton® FG and RP polymers, available from Kraton Polymers LLC; Lotader® polymers available from Arkema, Inc.; Polybond® and Royaltuf® polymers, available from Chemtura Corp.; and Exxelor polymers available from the ExxonMobil Corp.

Various polyamide compositions may be made in accordance with this invention. The composition may optionally contain an acid anhydride-modified polyolefin, plasticizer, fatty acid salt, fatty acid amide, fatty acid ester, and mixtures thereof. The resulting polyamide composition may be used to prepare a golf ball component (for example, core, casing, or cover layer) having several advantageous properties.

As noted above, it is significant that a blend comprising transparent polyamide and acid anhydride-modified polyolefin may be prepared. For example, a blend of 90%

Grivory® GTR45 transparent polyamide and 10% Fusabond® N525 acid anhydride-modified polyolefin may be prepared and the resulting composition (solid sphere) has a COR of 0.784, Atti compression of 182, and Shore D surface hardness of 81.8. In another example, a blend of 50% Grivory® GTR45 transparent polyamide and 50% Fusabond® N525 acid anhydride-modified polyolefin may be prepared and the resulting composition (solid sphere) has a COR of 0.633, Atti compression of 105, and Shore D surface hardness of 56.2.

In other embodiments, it is not necessary for the polyamide to be blended with an acid anhydride-modified polyolefin or any other polymer or non-polymer material. That is, the composition may consist entirely of the transparent polyamide. In other instances, the composition may include transparent polyamide at 97 to 100% by weight. In one particular version, the composition comprises transparent polyether-amide block copolymer such as the above-mentioned Rilsan® G300 HI, Pebax® Clear 300, or Pebax® Clear 400 (Arkema, Inc.).

The polyamide compositions of this invention may further contain a plasticizer. Adding the plasticizers to the composition helps to reduce the Tg of the composition. In addition to lowering the Tg, the plasticizer may also reduce the tan δ in the temperature range above the Tg. Tan δ is measured by a Dynamic Mechanical Analyzer (DMA). The plasticizer may also reduce the hardness and compression of the composition when compared to its non-plasticized condition.

Adding the plasticizers to the composition also helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures.

The polyamide compositions may contain one or more plasticizers. The plasticizers that may be used in the polyamide compositions of this invention include, for example, N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate.

Other suitable plasticizer compounds include benzene mono-, di-, and tricarboxylic acid esters. Phthalates such as bis(2-ethylhexyl) phthalate (DEHP), diisononyl phthalate (DINP), di-n-butyl phthalate (DBP), butyl benzyl phthalate (BBP), diisodecyl phthalate (DIDP), dioctyl phthalate (DnOP), diisooctyl phthalate (DIOP), diethyl phthalate (DEP), diisobutyl phthalate (DIBP), and di-n-hexyl phthalate are suitable. Iso- and terephthalates such as dioctyl terephthalate and dinonyl isophthalate may be used. Also appropriate are trimellitates, such as trimethyl trimellitate (TMTM), tri-(2-ethylhexyl) trimellitate (TOTM), tri-(n-octyl,n-decyl) trimellitate, tri-(heptyl,nonyl) trimellitate, tri-n-octyl trimellitate; as well as benzoates including, but not limited to, 2-ethylhexyl-4-hydroxy benzoate, n-octyl benzoate, methyl benzoate, and ethyl benzoate.

Also suitable are alkyl diacid esters commonly based on $C_4$-$C_{12}$ alkyl dicarboxylic acids such as adipic, sebacic, azelaic, and maleic acids such as: bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), dioctyl sebacate (DOS). Also, esters based on glycols, polyglycols, and polyhydric alcohols, such as poly(ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate, may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate.

Glycerol-based esters such as soy-bean, tung, or linseed oils or their epoxidized derivatives can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate (TBP), alkyl sulfonic acid phenyl esters (ASE); and sulfonamides such as N-ethyl toluene sulfonamide, N-(2-hydroxypropyl) benzene sulfonamide, N-(n-butyl) benzene sulfonamide. Furthermore, thioester and thioether variants of the plasticizer compounds mentioned above are suitable.

Non-ester plasticizers such as alcohols, polyhydric alcohols, glycols, polyglycols, and polyethers are suitable materials for plasticization. Materials such as polytetramethylene ether glycol, poly(ethylene glycol), and poly(propylene glycol), oleyl alcohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of polyamide plasticizers that may be used in the composition of this invention include butylbenzenesulphonamide (BBSA), ethylhexyl para-hydroxybenzoate (EHPB) and decylhexyl para-hydroxybenzoate (DHPB), as disclosed in U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

U.S. Pat. No. 7,045,185, the disclosure of which is hereby incorporated by reference, discloses sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides are particularly preferred plasticizers fur use in the present invention, and these materials are described in U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide. Such sulfonamide plasticizers also are described in U.S. Patent Application Publication No. 2010/0183837, the disclosure of which is hereby incorporated by reference. The polyamide compositions containing plasticizer, as described in the above patent references, also may be used in this invention.

Preferred golf ball constructions of the present invention include a golf ball having a 3-layer cover including an inner cover layer, an intermediate cover layer, and an outer cover layer, where the intermediate layer comprises a transparent polyamide or a blend thereof. The golf ball may, alternatively, have a 2-layer cover including an inner cover layer and an outer cover layer, where the inner cover layer is formed from a transparent polyamide or blend thereof. The transparent polyamides of the present invention preferably have a Tg of about 75° C. to about 160° C., more preferably about 80° C. to 95° C., and a Charpy notched impact resistance of about 15 kJ/m$^2$ at 23° C. or greater, more preferably about 50 kJ/m$^2$ at 23° C. or greater. Preferred transparent polyamides or blends thereof for use in intermediate layers of the invention have a ratio of Charpy notched impact resistance at 23° C. to Charpy notched impact resistance at −30° C. of at least about 2.0, more preferably at least about 4.0.

Preferred transparent polyamides include those having an amorphous, quasi-amorphous, semi-crystalline, or microcrystalline structure. One preferred transparent polyamide is a polyether-amide block copolymer. An alternative preferred embodiment includes an intermediate layer formed from a blend of transparent and non-transparent polyamides.

In an alternative embodiment, the golf ball has a 3-layer cover including an inner cover layer, an intermediate cover layer, and an outer cover layer, where the intermediate layer comprises a plasticized polyamide. The plasticized polyamide material, or blends thereof, may also be used in a 2-piece golf ball construction to form the inner cover layer. The plasticized polyamide composition typically include about 40% by weight to about 99% by weight polyamide and about 1% by weight to about 60% by weight of a plasticizer. Preferably the polyamide is polyether-amide block polymers, polyamide 6; polyamide 6,6; polyamide 6,10; polyamide 6,12; polyamide 11; polyamide 12; polyamide 6,9; and polyamide 4,6, and copolymers and blends thereof and the plasticizer is the plasticizer is selected from the group consisting of N-butylbenzenesulfonamide; N-ethylbenzenesulfonamide; N-propylbenzenesulfonamide; N-butyl-N-dodecylbenzenesulfonamide; N,N-dimethylbenzenesulfonamide; p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate, propylene carbonate, an alkyl or aryl fatty acid ester. In a preferred embodiment, the plasticizer is ethyl oleate or propylene carbonate. The plasticized polyamides or blends thereof may be transparent and non-transparent.

In any of these constructions, it is preferred that the transparent polyamide material have a light transmission of at least about 80%, more preferably about 85%, and most preferably about 90%. In an alternative construction, the intermediate layer in a 3-layer cover or the inner cover layer in a 2-layer cover may be formed from a transparent polyamide (or blend of transparent polyamides) and an acid-anhydride-modified polyolefin, such as Fusabond®, where the acid-anhydride-modified polyolefin is preferably present in an amount of about 1% by wt to about 60% by wt. The acid anhydride-modified polyolefin is preferably an ethylene-based copolymer—the acid anhydride used to modify the ethylene-based copolymer can be, for example, maleic, fumaric, nadic, itaconic, and clorendic acid anhydrides, and substituted derivatives thereof.

While the inventive golf ball may be formed from a variety of differing cover materials, preferred outer cover layer materials include, but are not limited to, (1) polyurethanes, such as those prepared from polyols or polyamines and diisocyanates or polyisocyanates and/or their prepolymers, and those disclosed in U.S. Pat. Nos. 5,334,673 and 6,506,851; (2) polyureas, such as those disclosed in U.S. Pat. Nos. 5,484,870 and 6,835,794; (3) polyurethane-urea hybrids, blends or copolymers comprising urethane or urea segments; and (4) other suitable polyurethane compositions comprising a reaction product of at least one polyisocyanate and at least one curing agent are disclosed in U.S. Pat. Nos. 7,105,610 and 7,491,787, all of which are incorporated herein by reference.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated by reference in its entirety.

Exemplary polyisocyanates suitable for use in the outer cover layers of the invention include, but are not limited to, 4,4'-diphenylmethane diisocyanate (MDI); polymeric MDI; carbodiimide-modified liquid MDI; 4,4'-dicyclohexylmethane diisocyanate (H12MDI); p-phenylene diisocyanate (PPDI); m-phenylene diisocyanate (MPDI); toluene diisocyanate (TDI); 3,3'-dimethyl-4,4'-biphenylene diisocyanate;

isophoronediisocyanate; 1,6-hexamethylene diisocyanate (HDI); naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer isocyanate groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 8.0% NCO, more preferably no greater than about 7.8%, and most preferably no greater than about 7.5% NCO with a level of NCO of about 7.2 or 7.0, or 6.5% NCO commonly used.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes are used to form one or more of the cover layers, preferably the outer cover layer, and may be selected from among both castable thermoset and thermoplastic polyurethanes. In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, that a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate. The most preferred saturated diisocyanates are 4,4'-dicyclohexylmethane diisocyanate and isophorone diisocyanate.

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino) cyclohexane; 1,4-bis-(sec-butylamino) cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas are suitable for the outer cover layers of the golf balls of the present invention.

Additionally, polyurethane can be replaced with or blended with a polyurea material. Polyureas are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as JEFFAMINE® D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate; 3,3'-dimethyl-4,4'-biphenylene diisocyanate; toluene diisocyanate; polymeric MDI; carbodiimide-modified liquid 4,4'-diphenylmethane diisocyanate; para-phenylene diisocyanate; meta-phenylene diisocyanate; triphenyl methane-4,4'- and triphenyl methane-4,4'-triisocyanate; naphthylene-1,5-diisocyanate; 2,4'-, 4,4'-, and 2,2-biphenyl diisocyanate; polyphenyl polymethylene polyisocyanate; mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate; triisocyanate of HDI; triisocyanate of 2,2,4-trimethyl-1,6-hexane diisocyanate; 4,4' dicyclohexylmethane diisocyanate; 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate; triisocyanate of HDI; triisocyanate of 2,2,4-trimethyl-1,6-hexane diisocyanate; 4,4' dicyclohexylmethane diisocyanate; 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis (2-hydroxypropyl) ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Any of the above inner, intermediate, or outer cover layer materials may also comprise additives known in the art, such as anti-oxidants, dyes, pigments, colorants, stabilizers, flame retardants, drip retardants, crystallization nucleators, metal salts, antistatic agents, plasticizers, lubricants, and combinations comprising two or more of the foregoing additives. Effective amounts are typically less than 5 wt %, based on the total weight of the composition, preferably 0.25 wt % to 2 wt %.

The layer compositions may also comprise fillers, including reinforcing fillers. Exemplary fillers include small particle minerals (e.g., clay, mica, talc, and the like), glass fibers, nanoparticles, organoclay, and the like and combinations comprising one or more of the foregoing fillers. Fillers are typically used in amounts of 5 wt % to 50 wt %, based on the total weight of the composition.

An optional filler component may be chosen to impart additional density to blends of the previously described components. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additives, such as nanoparticles, glass spheres, and various metals, such as titanium and tungsten, can be added to the polyurethane compositions of the present invention, in amounts as needed, for their well-known purposes. Additional components which can be added to the polyurethane composition include UV stabilizers and other dyes, as well as optical brighteners and fluorescent pigments and dyes. Such additional ingredients may be added in any amounts that will achieve their desired purpose.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety by reference thereto.

The outer cover is preferably formed around the core and intermediate cover layers by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the outer cover formation, mixing of the prepolymer and curative is accomplished in a motorized mixer including mixing head by feeding through lines metered amounts of curative and prepolymer. Top preheated mold halves are filled and placed in fixture units using pins moving into holes in each mold. After the reacting materials have resided in top mold halves for about 40 to about 80 seconds, a core is lowered at a controlled speed into the gelling reacting mixture. At a later time, a bottom mold half or a series of bottom mold halves have similar mixture amounts introduced into the cavity.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. Nos. 5,006,297 and 5,334,673 both disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety.

Other methods of molding include reaction injection molding (RIM) where two liquid components are injected into a mold holding a pre-positioned core. The liquid components react to form a solid, thermoset polymeric composition, typically a polyurethane or polyurea.

The golf balls of the present invention typically have a COR of greater than about 0.775, preferably greater than about 0.795, and more preferably greater than about 0.800. The golf balls also typically have an Atti compression of at least about 40, preferably from about 50 to 120, and more preferably from about 60 to 110. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to normalize the diameter of the measured object to 1.680 inches.

It should be understood that there is a fundamental difference between 'material hardness' and 'hardness' (as measured directly on a curved surface, such as a golf ball). Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a different measurement and, therefore, many times produces a different hardness value. This difference results from a number of factors including, but not limited to, ball construction (i.e., core type, number of core and/or cover layers, etc.), ball (or sphere) diameter, and the material composition of adjacent layers (especially measuring soft, very thin layers over a layer from a harder material). It should also be understood that the two measurement techniques are not linearly related and, therefore, one hardness value cannot easily be correlated to the other. As used herein, the term "hardness" refers to hardness measured on the curved surface of the layer being measured (i.e., sphere including core+inner cover, sphere including core+inner cover+intermediate cover, or sphere including core+inner cover+intermediate cover+outer cover).

The inner cover layer has a hardness of about 45 to 68 Shore D, preferably about 50 to 62 Shore D, and more preferably about 52 to 60 Shore D. In preferred embodiments, the inner cover layer preferably has a hardness of 55 to 60 Shore D, more preferably 56 to 59 Shore D, most preferably 57 to 58 Shore D. Alternatively, the inner cover layer has a hardness of about 55 to 98 Shore C, preferably about 66 to 90 Shore C, and more preferably about 74 to 86 Shore C. In preferred embodiments, the inner cover layer preferably has a hardness of 76 to 85 Shore C, more preferably 78 to 84 Shore C, most preferably 80 to 83 Shore C.

The intermediate cover layer has a hardness of about 55 to 90 Shore D, preferably about 57 to 80 Shore D, and more preferably about 61 to 69 Shore D. Alternatively, the intermediate cover layer has a hardness of about 65 to 110 Shore C, preferably about 72 to 100 Shore C, and more preferably about 74 to 92 Shore C.

The outer cover layer has a hardness of about 35 to 65 Shore D, preferably about 40 to 62 Shore D, and more preferably about 52 to 60 Shore D. In preferred embodiments, the outer cover layer preferably has a hardness of 55 to 60 Shore D, more preferably 56 to 59 Shore D, most preferably 57 to 58 Shore D. Alternatively, the outer cover layer has a hardness of about 55 to 90 Shore C, preferably about 62 to 86 Shore C, and more preferably about 68 to 82 Shore C. In preferred embodiments, the outer cover layer preferably has a hardness of 76 to 85 Shore C, more preferably 78 to 84 Shore C, most preferably 80 to 83 Shore C.

In a particularly preferred embodiment, a golf ball is formed from a core, an inner cover layer, an intermediate cover layer, and an outer cover layer. The core is a single, solid core having an outer diameter of about 1.52 inches. The inner cover layer is formed from a non-ionomeric E/Y copolymer comprising an ethylene/acrylic acid copolymer and has a thickness of about 0.035 inches and a hardness of about 58 Shore D. Alternatively, the inner cover layer has a hardness of about 82 Shore C. The intermediate layer is formed from a thermoplastic polycarbonate-polyurethane copolymer and has a thickness of about 0.015 inches and a hardness of about 62 Shore D. Alternatively, the intermediate cover layer has a hardness of about 90 Shore C. The outer cover layer is formed from a thermosetting polyurethane and has a thickness of about 0.030 inches and a hardness of about 57 Shore D. Alternatively, the outer cover layer has a hardness of about 80 Shore C.

The relationship between the inner cover layer, the intermediate cover layer, and the outer cover layer is also important to the golf ball of the present invention. The outer cover layer has a first hardness, the intermediate cover layer has a second hardness, and the inner cover layer has a third hardness. The stiff TPU intermediate layer of the present invention has a hardness that is greater than the hardness of both the inner cover layer and the outer cover layer. The second hardness is at least 5 Shore D greater than the first and third hardness values, preferably at least 10 Shore D greater than the first and third hardness values, more preferably at least 15 Shore D greater than the first and third hardness values, and most preferably at least 20 Shore D greater than the first and third hardness values.

The core of the present invention has an Atti compression of between about 50 and about 90, more preferably, between about 60 and about 85, and most preferably, between about 70 and about 80. The outer diameter of the core is about 1.45 inches to 1.58 inches, more preferably about 1.50 inches to 1.56 inches, most preferably about 1.51 inches to 1.55 inches.

The thickness of the inner cover layer is preferably about 0.010 inches to 0.075 inches, more preferably about 0.030 inches to 0.060 inches, most preferably about 0.035 inches to 0.050 inches.

The thickness of the intermediate cover layer is preferably about 0.010 inches to 0.075 inches, more preferably about 0.030 inches to 0.060 inches, most preferably about 0.035 inches to 0.050 inches. In one alternative preferred embodiment, the thickness of the intermediate cover layer is about 0.015 inches to 0.030 inches.

The thickness of the outer cover layer is preferably about 0.005 inches to 0.045 inches, more preferably about 0.020 inches to 0.040 inches, and most preferably about 0.025 inches to 0.035 inches.

The golf ball can have an overall diameter of any size. While the United States Golf Association limits the minimum size of a golf ball to 1.680 inches, there is no maximum diameter. The golf ball diameter is preferably about 1.68 inches to 1.74 inches, more preferably about 1.68 inches to about 1.70 inches, and most preferably about 1.68 inches.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. Typical dimple coverage is greater than about 60%, preferably greater than about 65%, and more preferably greater than about 75%. The parting line configuration of said pattern may be either a straight line or a staggered wave parting line (SWPL). Most preferably the dimple number is 330, 332, or 392 and comprises 5 to 7 dimples sizes and the parting line is a SWPL.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising:
   a core; and
   a two-layer cover disposed about the core, the two-layer cover comprising:
      an inner cover layer disposed about the core, the inner layer comprising a polyamide composition; and
      a castable thermoset polyurethane outer cover layer having a hardness from about 40 Shore D to about 62 Shore D;
   wherein the polyamide composition comprises a transparent polyamide having a light transmission of about 50% or greater, a glass transition temperature of about 75° C. to about 160° C., and a ratio of Charpy notched impact-resistance measured at 23° C. and at −30° C. of at least about 2.0.

2. The golf ball of claim 1, wherein the transparent polyamide comprises a transparent polyether-amide block copolymer.

3. The golf ball of claim 1, wherein the transparent polyamide has an amorphous, quasi-amorphous, semicrystalline, or microcrystalline structure.

4. The golf ball of claim 1, wherein the transparent polyamide has a glass transition temperature in the range of about 75° C. to about 160° C.

5. The golf ball of claim 4, wherein the transparent polyamide has a glass transition temperature in the range of about 80° C. to about 95° C.

6. The golf ball of claim 1, wherein the transparent polyamide has a Charpy notched impact-resistance of about 15 kJ/m$^2$ or greater when measured at 23° C.

7. The golf ball of claim 6, wherein the Charpy notched impact-resistance is about 50 kJ/m$^2$ or greater when measured at 23° C.

8. The golf ball of claim 1, wherein the transparent polyamide has a light transmission of about 80% or greater.

9. The golf ball of claim 8, wherein the light transmission is about 90% or greater.

10. The golf ball of claim 1, wherein the transparent polyamide further comprises about 1% by weight to about 60% by weight of an acid anhydride-modified polyolefin.

* * * * *